Jan. 14, 1969  O. A. KERSHNER  3,421,320
HYDRAULIC BOOSTER-EQUALIZER VALVE ASSEMBLY
Filed May 24, 1967  Sheet 1 of 4
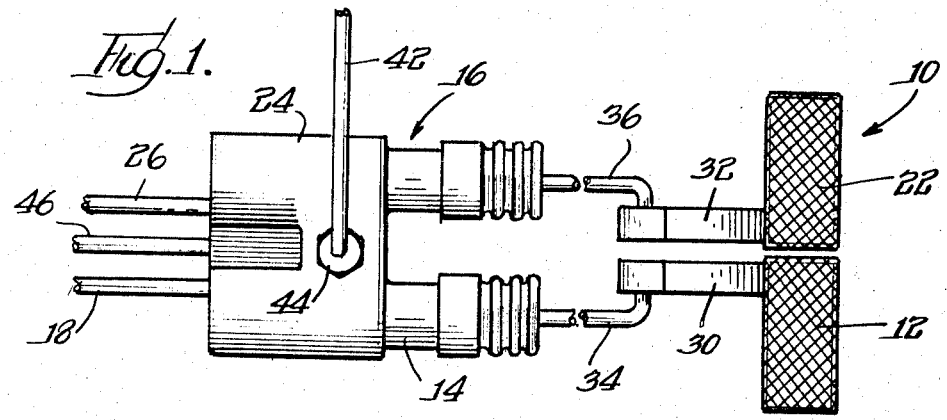
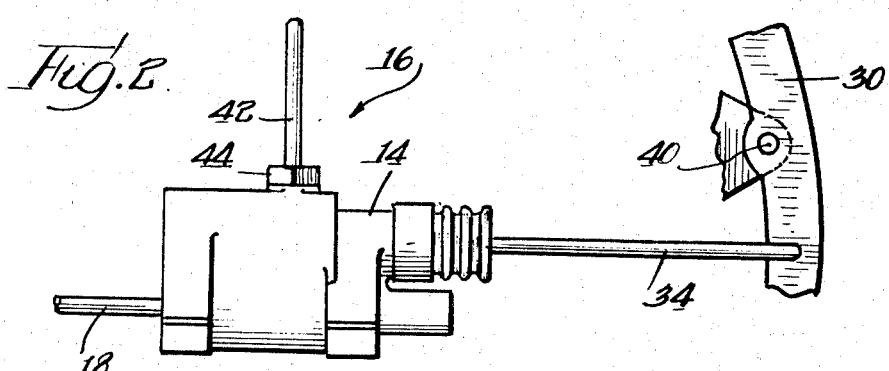
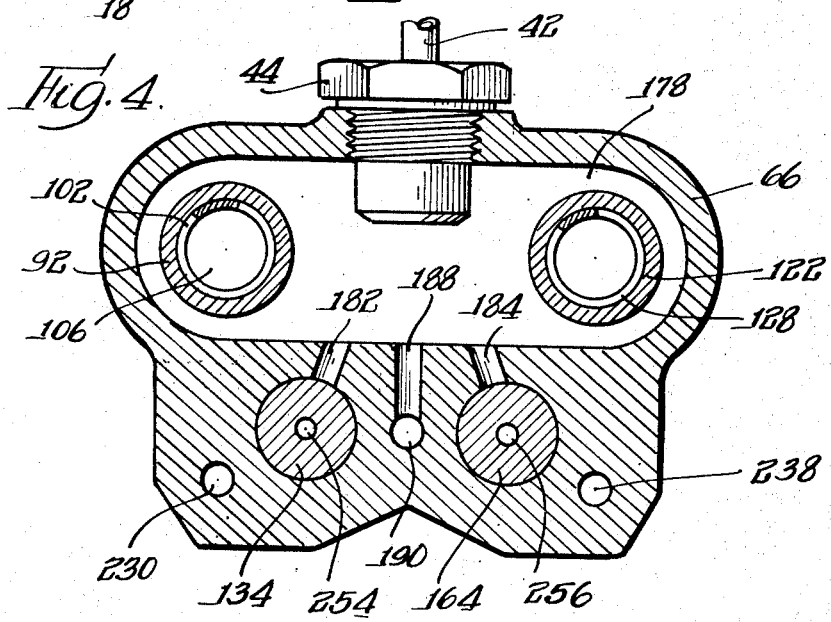
Inventor
Osborn A. Kershner
By: Olson, Trexler, Wolters & Bushnell attys.

Jan. 14, 1969  O. A. KERSHNER  3,421,320
HYDRAULIC BOOSTER-EQUALIZER VALVE ASSEMBLY
Filed May 24, 1967

Inventor
Osborn A. Kershner
By: Olson, Trexler, Wolters & Bushnell attys.

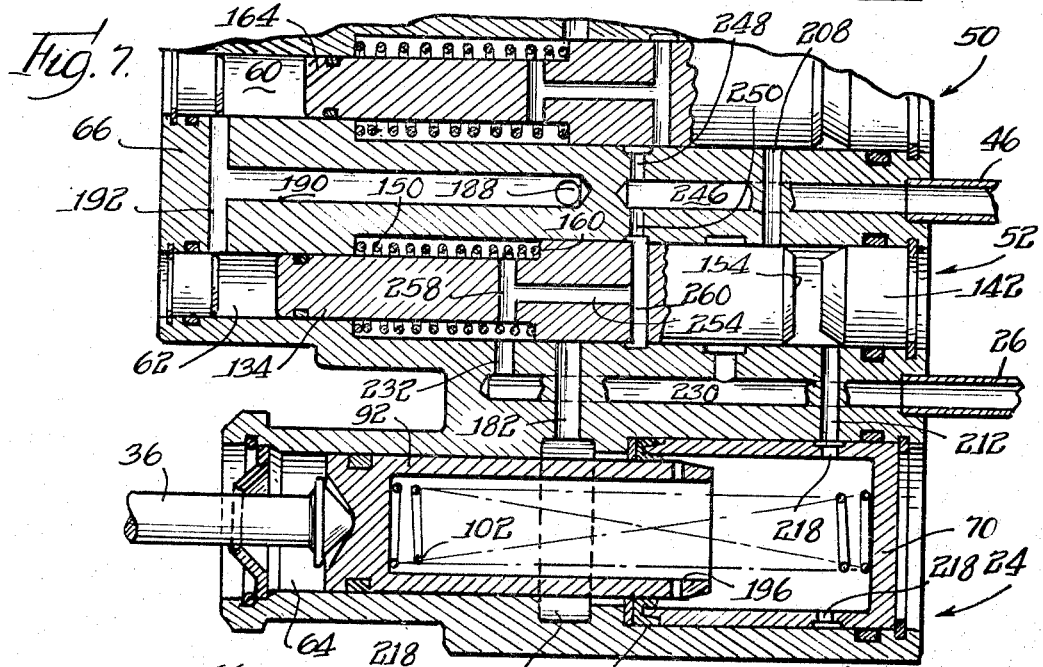
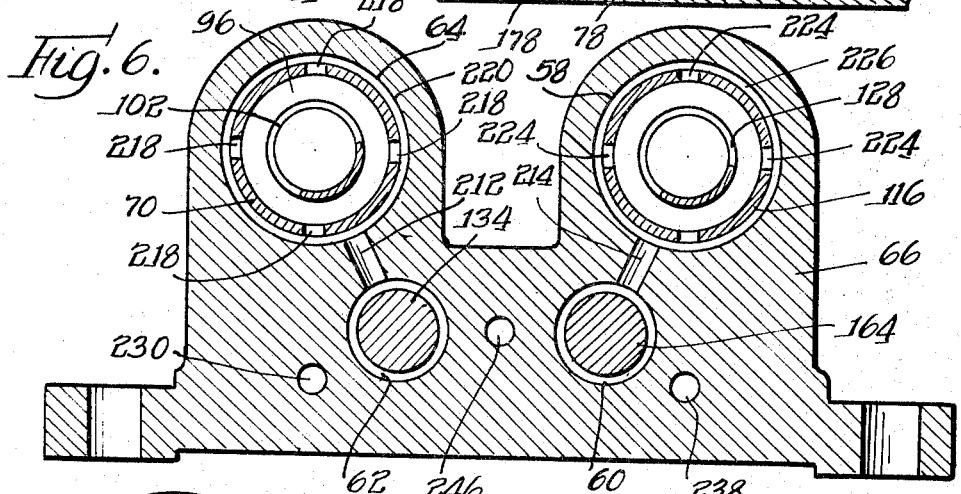
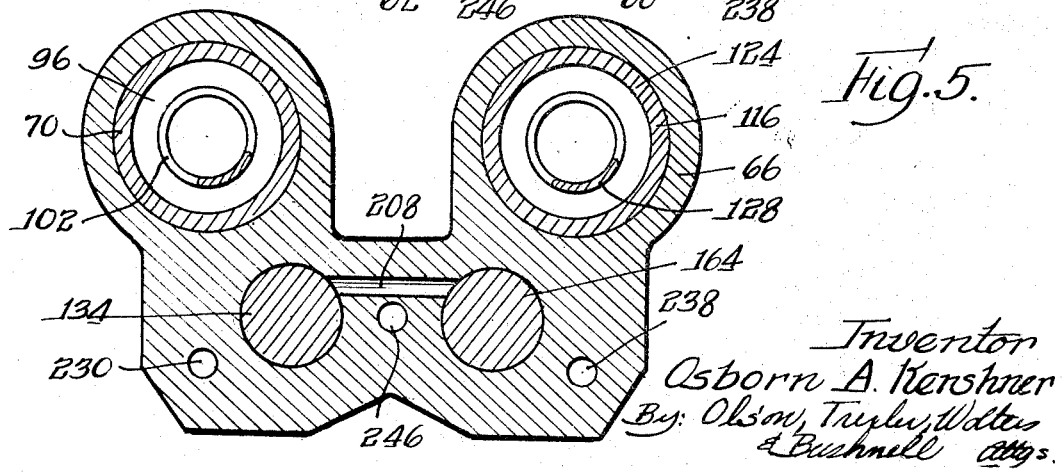

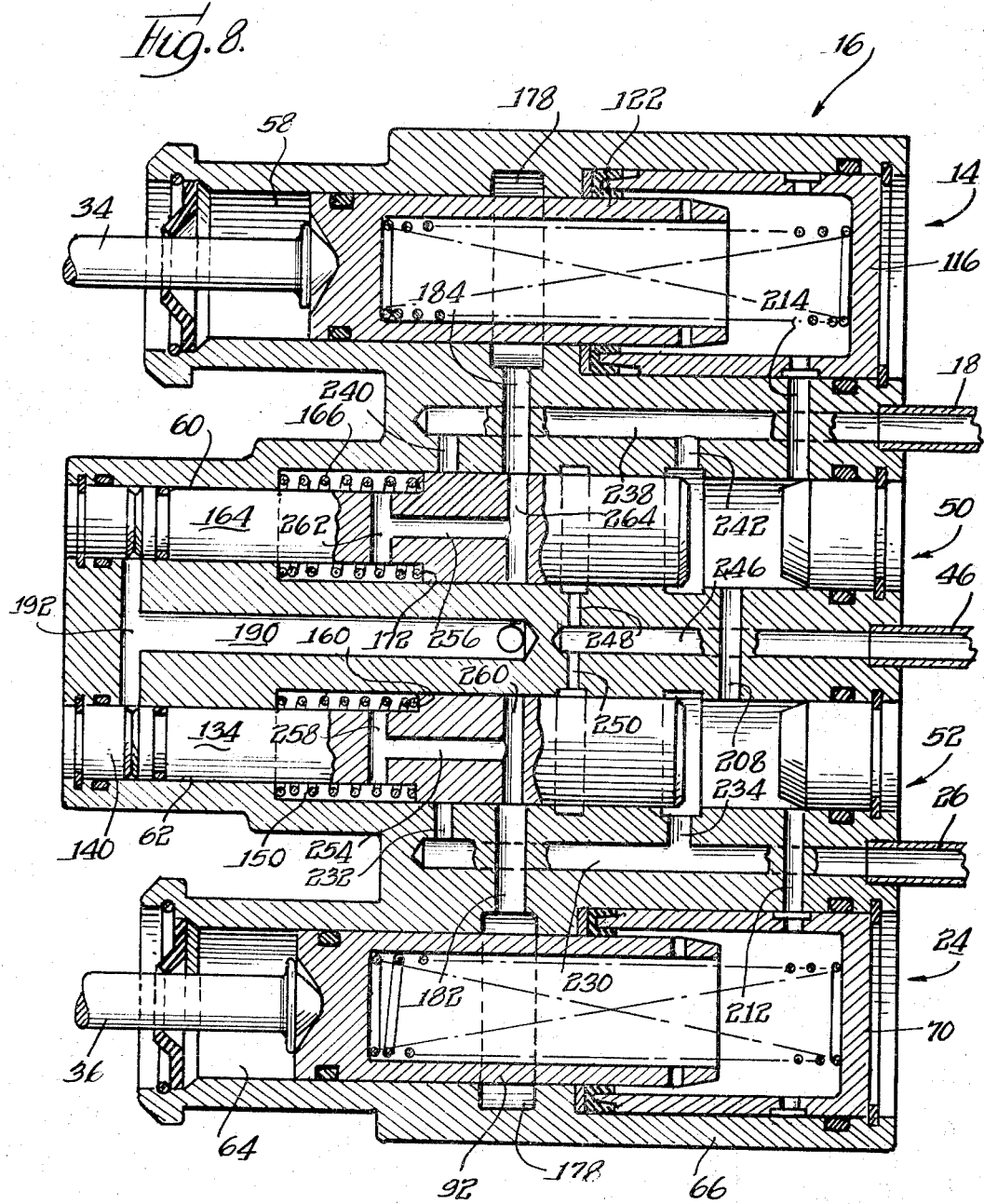

United States Patent Office 3,421,320
Patented Jan. 14, 1969

3,421,320
HYDRAULIC BOOSTER-EQUALIZER VALVE ASSEMBLY
Osborn A. Kershner, St. Joseph, Mich., assignor, by mesne assignments, to Lambert Brake Corporation, St. Joseph, Mich., a corporation of Michigan
Filed May 24, 1967, Ser. No. 640,954
U.S. Cl. 60—54.5
Int. Cl. F15b 7/00
12 Claims

ABSTRACT OF THE DISCLOSURE

This invention relates to a combination booster and equalizer assembly for a power braking system. More particularly this invention relates to an assembly having a master cylinder associated with a valve means to connect a brake means to a source of fluid under pressure upon actuation of the master cylinder.

---

Power braking systems are commonly used on tractors and other vehicles for controlling the movement of the tractor. The direction of motion of the tractor is changed by actuating a first braking system to retard rotation of one wheel and turn the tractor in a first direction. A second braking system is provided for retarding the rotation of a second wheel or ground engaging means and turning the tractor in a second direction. The application of the brakes is usually assisted by high pressure fluid from a hydraulic pump operated off the engine of the vehicle.

Due to the independent action of the braking systems, one brake system will invariably be subject to greater usage than the other. Of course, the brake system which is used the most will have the greatest amount of wear and brake pedal travel. When both brake systems are actuated contemporaneously to stop the vehicle without turning the vehicle, the brake system having the shortest pedal travel will be engaged or pressurized first, causing the vehicle to swerve toward the side being braked first. This uneven actuation and swerving occurs even with brake systems which are adjusted automatically, since an increment of adjustment of the brake system is usually not fine enough to prevent uneven actuation of the brake systems. Thus, swerving is commonly regarded as an inherent danger in the use of a plurality of brake systems.

Therefore, it is an object of this invention to provide a braking system which overcomes the aforementioned limitations of prior art constructions. Specifically, it is an object of this invention to provide a combination master cylinder and valve structure which controls power systems in the operation of the brake system.

It is another object of this invention to provide a valving system which enables a plurality of brake systems to be operated independently to alter the direction of motion of a vehicle and also enables simultaneous and uniform operation of the plurality of brake systems to stop the vehicle without swerving.

It is another object of this invention to provide a power assisted brake actuation structure which is operable in the event of the failure of the power assistance to stop a vehicle.

It is another object of this invention to provide an inexpensive and easily assembled power booster assembly for a brake system.

These and other objects of the invention will become more apparent from a consideration of the following detailed description taken in connection with the accompanying drawings wherein:

FIG. 1 is a plan view illustrating the relationship of a plurality of brake actuation pedals to a booster-equalizer assembly for energizing a plurality of brake systems to control a vehicle's motion;

FIG. 2 is an elevational view of the brake system of FIG. 1;

FIG. 4 is an enlarged sectional view, taken along the line 4—4 of FIG. 3, illustrating the structure of the booster-equalizer assembly;

Figure 3:
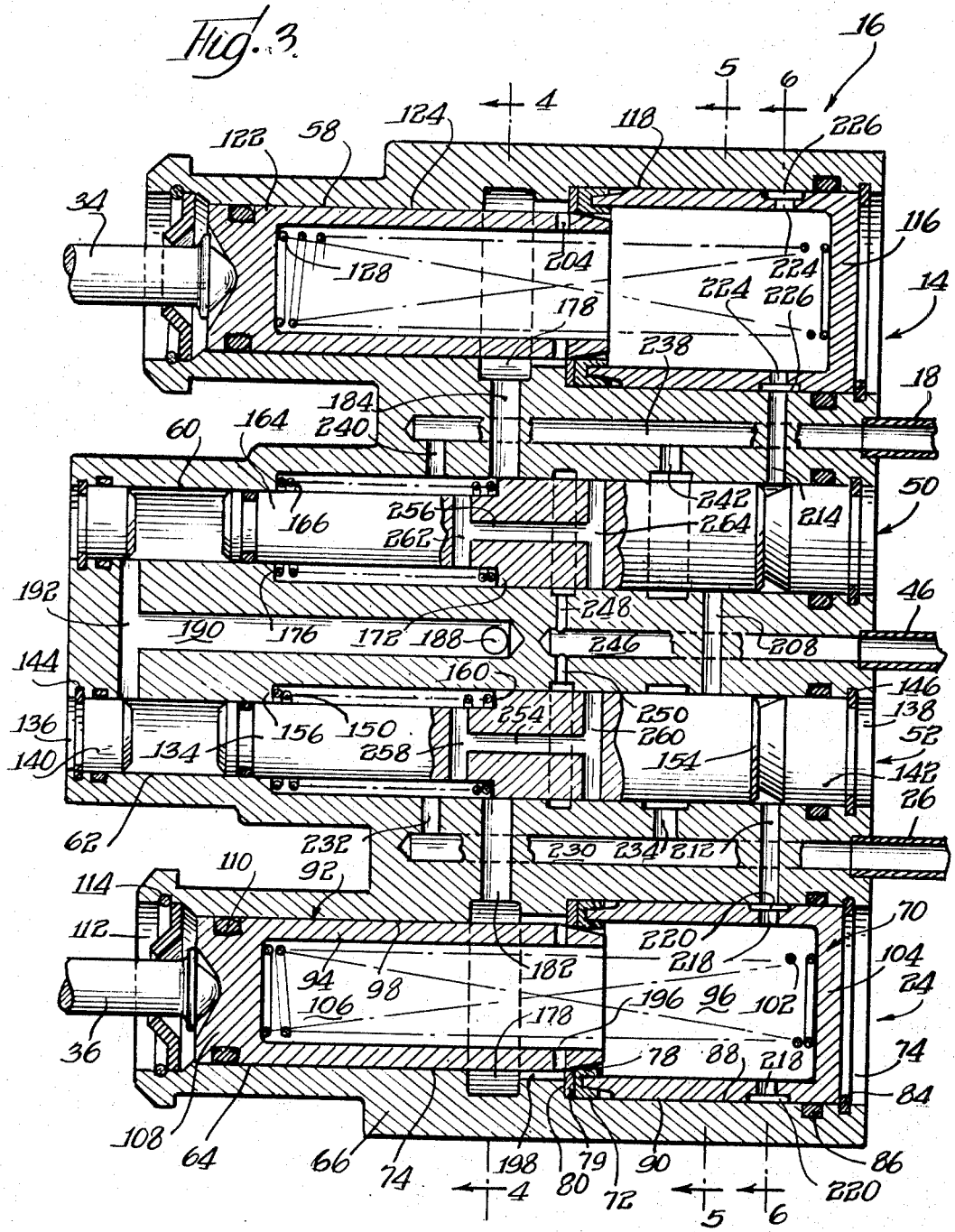
FIG. 3 is an enlarged folded-out illustration of the booster-equalizer assembly of FIG. 1, the booster-equalizer assembly being shown in an initial or neutral position.

FIGS. 5 and 6 are enlarged sectional views, taken along the lines 5—5 and 6—6 of FIG. 3, respectively, further illustrating the structure of the booster-equalizer assembly;

FIG. 7 is a fragmentary folded-out sectional illustration, similar to FIG. 3, but on a slightly reduced scale, illustrating the booster equalizer assembly in an operating or intermediate position; and FIG. 8 is an enlarged folded out sectional illustration, similar to FIG. 3, illustrating the booster-equalizer assembly in a power assist failure or emergency position.

A brake system 10 for a vehicle is partially illustrated in FIG. 1. The brake system includes a right pedal 12 which is operated or depressed in a forward direction to actuate a master cylinder assembly 14 of a booster-equalizer assembly 16. Actuation of the master cylinder assembly 14 increases fluid pressure in a brake line 18 which is connected to a right brake of the vehicle. Similarly, a left brake pedal 22 is operated or depressed to actuate a master cylinder assembly 24 which increases hydraulic pressure in a brake line 26 to energize or operate a left brake of the vehicle. The brake pedals 12 and 22 are connected to levers 30 and 32 which are in turn connected to push rods 34 and 36 for actuating the master cylinder assemblies 14 and 24. The levers 30 and 32 are pivotally mounted (see FIG. 2) on pivot pins 40 so that when the levers 30 and 32 are rotated in a clockwise direction, as viewed in FIG. 2, the push rods 34 and 36 are moved rearwardly toward the booster-equalizer assembly 16 to operate the master cylinder assemblies associated with the push rods. A brake fluid line or conduit 42 is connected to a plug 44 of a brake fluid reservoir or container in the booster-equalizer assembly 16. The line or conduit 42 is connected at its opposite end to an auxiliary supply of brake fluid. The operation of the brakes is assisted by high pressure fluid from a pump mounted on the motor of the vehicle. The high pressure fluid is conducted from the pump to the booster-equalizer assembly 16 by a passage or conduit 46.

Referring now to FIG. 3, the booster-equalizer assembly 16 is shown in a folded out sectional view and includes a pair of equalizer or control valve assemblies 50 and 52 which are associated with the master cylinder assemblies 14 and 24, respectively. The master cylinder assemblies 14 and 24 and the associated control valve assemblies 50 and 52 are mounted in a plurality of chambers or cavities 58, 60, 62 and 64 which are formed in a housing or body 66. The chambers 58 through 64 are interconnected by a plurality of passages which are also formed in the housing 66.

The left master cylinder assembly 24 includes a cylindrical plug or member 70 which is fixedly mounted in a first or rearward section 72 of the chamber 64. The cylinder member 70 is inserted into the rearward section 72 of the chamber 64 through an outer end opening 74 of the chamber 64. A chevron type seal 78 is mounted on an inner end of the cylinder member 70 for engagement with a washer 79 which abuts a radially extending wall 80. The wall 80 separates the relatively large diameter rearward section 72 from a relatively small diameter second or forward section 74 of the chamber 64. The cylinder member 70 is fixedly held in the chamber 64 by a retaining ring 84. An O-ring seal 86 is provided adjacent to an outer end of the cylinder member 70 to seal a joint between an outer side surface 88 of the cylinder member 70 and an inner surface 90 of the chamber 64.

A piston 92 is mounted in the second relatively small diameter section 74 of the chamber 64. The piston 92 includes a cylindrical side wall 94 which extends into a cylinder chamber or cavity 96 in a telescopic relationship with the cylinder member 70. An outer surface 98 of the side wall 94 is engaged by the chevron seal 78 to seal a joint between the cylinder member 70 and piston 92 at an inner opening or mouth of the cylinder chamber 96. A return spring 102 is positioned within the cylinder member 70 and piston 92 and extends from an end wall 104 of the cylinder member 70 through the cylinder chamber 96 into a piston chamber 106 within the piston 92 to engage a head or end wall 108 of the piston 92. An O-ring seal 110 is provided between an inner surface of the chamber section 74 and the piston head 108. The piston head 108 is engaged by the push rod 36 which extends through a central hole or aperture in a washer 112 which is held in place by a retaining ring 114. When the left brake pedal 22 is depressed the piston 92 is moved rearwardly into the cylinder member 70. It should be noted that this relative movement between the piston 92 and cylinder member 70 is faciliated by the spacing apart of the walls of the piston and cylinder to reduce friction and binding.

The right master cylinder assembly 14 is generally similar in structure to the left master cylinder assembly 24 and includes a cylinder member 116 mounted in a first section 118 of the chamber 58. A piston 122 is mounted in a second section 124 of the chamber 58. The push rod 34 engages the piston 122 to move the piston relative to the cylinder member 116 in much the same manner as the push rod 36 engages the piston 92 to move the piston relative to the cylinder member 70. A return spring 128 is mounted within the piston 122 and cylinder member 116. The return springs 102 and 128 press the push rods 34 and 36 outwardly relative to the housing 66 to return the brake pedals 12 and 22 to their normal positions. Upon an initial actuation of the brake pedals 12 and 22 the return springs 102 and 128 provide a "feel" or initial resistance to the actuation of the cylinder assemblies 14 and 24.

The left equalizer or control valve assembly 52 includes a slidable valve member or piston 134 which is mounted in the chamber 62. Outer ends 136 and 138 of the chamber 62 are closed or sealed by plugs or blocks 140 and 142 which are held in place by retaining rings 144 and 146. The valve member 134 is urged by a return spring 150, mounted in a central portion of the chamber 62, toward an initial position shown in FIG. 3. In the initial position a rearward end wall 154 is positioned in engagement with an end wall of the plug 142. The return spring 150 engages a radial shoulder 156 formed in the chamber 62 and a radially outwardly extending surface 160 of the cylindrical valve member 134 to urge the valve member toward the neutral position.

The control valve assembly 50 is generally similar in construction to the control valve assembly 52 and includes a valve member or piston 164 which is slidably mounted in the chamber 60. The piston 164 is urged toward the initial or neutral position, shown in FIG. 3, by a spring 166 which engages a radial shoulder 176 of the chamber 60 and a radially outwardly extending surface 172 of the valve member 164 in much the same manner as the spring 150 engages the surfaces 156 and 160. The control valve assemblies 50 and 52 and master cylinder assemblies 14 and 24 are normally or initially in the neutral position shown in FIG. 3 before either the brake pedal 12 or 22 is actuated to energize or operate a brake assembly to alter the motion of a vehicle in which the braking system 10 is installed.

Referring now to FIG. 4, taken in connection with FIG. 3, a reservoir 178 is provided in the housing 66 for holding brake fluid at a normal or atmospheric pressure. The reservoir 178 is constantly maintained in a substantially filled condition with brake fluid conducted through the line or conduit 42 from an auxiliary supply. The pistons 92 and 122 extend through the reservoir 178 which is connected by passages 182 and 184 to central sections of the chambers 60 and 62. The reservoir 178, while having a relatively large transverse dimension or cross-section as is seen in FIG. 4, has a relatively small longitudinal dimension or cross-section, as is best seen in FIG. 3. The auxiliary supply of brake fluid insures that an adequate volume of brake fluid is present in the reservoir 178 at all times.

In addition to being connected to the central sections of the chambers 60 and 62 by the passages 182 and 184, the reservoir 178 is connected to forward end sections of the chambers 60 and 62 by an upwardly extending passage 188 which is connected to a longitudinally extending passage 190 (see FIG. 3). The longitudinally extending passage 190 is in turn connected to a cross or transverse passage 192 extending between the two chambers 60 and 62. It should be noted that the cylinder chamber 96 and piston chamber 106 are in fluid communication with the reservoir 178 when the master cylinder assembly 24 is in the initial or neutral position of FIG. 3. This fluid communication results from a fluid circuit including a plurality of radially outwardly extending passages or apertures 196 in the inner end of the piston 92. The fluid circuit is completed to the reservoir 178 through a passage or manifold 198 having an annular cross-section extending between the outer surface 98 of the piston 92 and the inner surface of the chamber 64. A plurality of apertures 204 are provided in the piston 122 of the right master cylinder assembly 14 to provide fluid communication between the reservoir 178 and the interior of the piston 122 and cylinder member 116. The reservoir 178 maintains a constant fluid level within the piston and cylinder members of both master cylinder assemblies.

Referring now to FIG. 3, taken in connection with FIG. 5, it can be seen that the valve chambers 60 and 62 are interconnected by a passage 208 which extends transversely of the housing 66. As is perhaps best seen in FIGS. 3 and 6, rearward sections of the chambers 62 and 64 are interconnected by a transversely downwardly extending passage 212, while the chambers 58 and 60 are interconnected by a transversely extending passage 214. A plurality of apertures or passages 218 in the side wall of the left cylinder member 70 are connected by a manifold ring or passage 220 to the passage 212. Thus, fluid communication is provided between the cylinder chamber 96 and the chamber 62 by a fluid circuit including the passage 212, the manifold ring 220 and the apertures 218. Similarly, apertures 224 are provided in the cylinder member 116 to connect the interior of the cylinder member 116 with the passage 214 through a manifold ring 226. When the telescopic relationship between the pistons 92 and 122 and cylinder members 70 and 116 is increased fluid is expelled from the piston and cylinder chambers through the apertures 218 and 224 into the passages 212 and 214, to apply fluid pressure against the rearward end walls of the valve members 134 and 164.

The chamber 62 is connected to the left conduit or brake line 26 by a longitudinally extending passage 230 which is in turn connected by transversely extending passages 232 and 234 to the chamber 62 at spaced apart areas on the wall of the chamber. Similarly, the chamber 60 is connected to the right brake line or conduit 18 by a longitudinally extending passage 238 which is connected to transversely extending passages 240 and 242. The spatial relationship of the passages 230 and 238, and the other components of the booster-equalizer assembly 16 can best be seen in FIGS. 4 through 6.

The high pressure supply line or conduit 46 is connected by a longitudinally extending central passage 246 and a pair of transversely extending passages 248 and 250 to the chambers 60 and 62. The valve members 134 and 164 include central longitudinally extending connector passages 254 and 256 which interconnect transversely extending cross passages 258, 260, 262 and 264.

In view of the foregoing remarks, it is apparent that the booster-equalizer assembly 16 includes a pair of master cylinder assemblies 14 and 24 which are associated with control valve assemblies 50 and 52 in a common housing 66 in which a plurality of passages are formed to interconnect the control valve assemblies and master cylinder assemblies. The fabrication of the booster-equalizer assembly 16 is facilitated by the use of cylinder members 70 and 116 and pistons 92 and 122 in chambers 58 and 64 which extend substantially through the housing 66. Expensive machining of the chambers 58 and 64 is eliminated by the use of the cylinder member 70 which is held in the chamber 64 by a retaining ring 84. The seals 78 and 86 prevent brake fluid from leaking out of the master cylinder assembly 24 at the joints between the cylinder member 70 and the inner surface of the chamber 64. The cylinder member 116 is mounted in a similar manner in the chamber 58. The piston member 92 is inserted into the opposite end of the chamber 64 and moved into telescopic engagement with the cylinder member 104. The seal 110 at the head 108 of the piston 92 eliminates the necessity of close tolerances between the outer surface of the piston and the inner surface of the chamber 64.

The valve members 134 and 164 are mounted in a similar manner in chambers 62 and 60 which also extend through the housing 66. The valve member 134 and spring 150 are merely inserted through the end 138 of the chamber 62 and the plugs 140 and 142 clamped in place by retaining rings 144 and 146 to seal the chamber against dirt and other foreign materials and leakage of brake fluid out of the chamber. Of course, the valve member 164 is mounted in a similar manner. Although it is preferred to use a single housing 66 to hold the master cylinder assemblies 14 and 24 in a compact relationship with the valve assemblies 50 and 52, and to extend passages through the housing 66 to interconnect chambers in which the valve assemblies and master cylinder assemblies are mounted, the master cylinder assemblies and valve assemblies can be mounted in separate housings interconnected by conduits to provide the requisite passages between the valve members and master cylinder assemblies.

Having described one construction of the invention in detail, it is advantageous now to provide a functional description of the mode in which the component parts cooperate. The booster-equalizer assembly 16 will be in an initial or neutral position shown in FIG. 3 before the brake pedals 12 and 22 are depressed to energize brake assemblies associated with wheels on opposite sides of a vehicle. The reservoir 178 will be full of brake fluid at a normal or atmospheric pressure. This brake fluid will flow or extend through the apertures 196 and 204 in the pistons 92 and 122, through the central interior chambers of the cylinder members 70 and 116, apertures 218 and 224, and passages 212 and 214 to the chambers 60 and 62, so that the rearward end walls of the valve members 134 and 164 are engaged by a body of brake fluid which is at atmospheric pressure. The passages 184 and 196 also connect the central portion of the chambers 60 and 62 to the reservoir 178 so that the brake lines 18 and 26 are exhausted or in fluid communication with fluid at atmospheric pressure through the passages 238 and 240 and 230 and 232, respectively. In the initial or neutral position the passages 248 and 250, which are connected to the high pressure fluid line 46, are blocked by outer longitudinally extending side surfaces of the valve members 134 and 164.

When the left brake pedal 22 is depressed or operated the pushrod 36 is pressed inwardly, as shown in FIG. 7, to increase the telescopic relationship between the piston member 92 and cylinder member 70. As the piston member 92 is moved into the cylinder member 70, against the force of the return spring 102, relatively low pressure fluid is conducted through the apertures 218 and passage 212 into the rearward end of the chamber 62 to move the valve member 134 forwardly from the position shown in FIG. 3 to the position shown in FIG. 7 against the return spring 150. The forward movement of the valve member 134 will move the cross passage 260 into registration or alignment with the passage 250 which is in fluid communication with the high pressure fluid conduit or line 46. High pressure fluid from the line 46 will flow through the passages 246 and 250 into the cross passage 260, the connecting passage 254 and cross passage 258. The high pressure fluid will then flow out of the cross passage 258 into the central portion of the chamber 62. The pressure will then be transmitted by the brake fluid through the passages 232 and 230 to the brake line 26 for the left brake assembly. The high pressure fluid in the brake line 26 will actuate the left brake assembly in a known manner to retard rotation of the left wheel and turn the vehicle toward the left. It should be noted that while the valve member 134 is in the operating or intermediate position of FIG. 7, the valve member 164 which is associated with the right hand master cylinder assembly and brake assembly is in the initial position, so that the flow of high pressure fluid through the cross passage 248 into the chamber 60 is blocked by the side surface of the valve member 164 in the manner previously explained.

While the left brake is being actuated by high pressure fluid through the brake line 26, the high pressure fluid acting on surface 160 will also be exerting a force to the right or rearward, as viewed in FIG. 7, to tend to force or urge the valve member 134 to the initial or neutral position of FIG. 3. As the pressure against the surface 160 on the center section of the valve member 134 builds up, this force will exceed the force exerted on the rearward end surface 154 of the valve member 134 by the actuation of the master cylinder assembly 24. When the force on the surface 160 from the return spring 150 and high pressure fluid exceeds the force exerted on the surface 154 by fluid pressure caused by actuating the left brake pedal 10, the valve member 134 will be moved for a short distance in the rearward direction, or to the right as viewed in FIG. 7, to move the cross passage 260 out of registration or alignment with the passage 250 so that the passage 250 and the supply of high pressure fluid is blocked by the side surface of the valve member 134. When this occurs, the pressure in the brake line 26 will remain stabilized and the valve member will remain in a stabilized condition until the force on the push rod 36 is increased or decreased to again provide a condition of force unbalance between the opposing surfaces 154 and 160 of the valve member 134. It should be noted that the surface 160 is substantially smaller in area than surface 154 so that a relatively high fluid pressure must be exerted against the surface 160 to oppose a relatively low fluid pressure from the master cylinder assembly 24 before the valve member 134 is moved to a stabilized position.

After the left brake has been actuated for a period of time sufficient to turn the vehicle, the brake pedal 10 will be released and the piston member 92 will return to the initial position of FIG. 3 under the influence of both the spring 102 and the relatively high pressure fluid against the surface 160. When the valve member 134 is moved to the initial position of FIG. 3, the surface 160 will clear the end of the passage 182 to provide fluid communication between the reservoir 178 and chamber 62. The relatively high pressure fluid in the chamber 62 will then be exhausted to the reservoir 178. Of course, the pressure in the brake line 26 and passages 230 and 232 will decrease to the atmospheric pressure which is present in the reservoir 178. The brake system 16 will then be in the initial position of FIG. 3.

In view of the foregoing remarks it is apparent that the valve member 134 is moved from the initial position of FIG. 3 to an intermediate or operating position of FIG. 7 by an actuation or operation of the master cylinder assembly 24. The valve member 134 will remain in the operating position of FIG. 7 until the fluid pressure on the central radial surface 160 has increased to offset the fluid pressure exerted on the rearward end surface 154 of the valve member 134. After the fluid forces on the surface 160 exceeds the fluid force against the surface 154, the valve member 134 will be moved rearwardly to a stabilized position in which the pressure in the brake line 26 will remain relatively constant and the flow of high pressure fluid from the conduit 46 will be blocked by the outer longitudinal surface of the valve member 134. When the brake pedal is released, the valve member 134 will move still further in the rearward direction to the neutral position and exhaust the high pressure fluid in the brake line 26 to the fluid reservoir 178. The forward and rearward movement of the valve member 134 is facilitated by the passages 188, 190 and 192 which connect the forward or left end section (as viewed in FIG. 3) of the chamber 62 to the fluid reservoir 178 and provide a closed system.

The operation of the right master cylinder assembly 14 and control valve assembly 50 is substantially similar to the operation of the left master cylinder assembly 24 and control valve assembly 52. Therefore, further description of the operation of the right master cylinder assembly 14 is not believed to be necessary at this time.

When both the left and right brake pedals 12 and 22 are depressed, both master cylinder assemblies 14 and 24 and valve members 134 and 164 will move to the operating or intermediate position in which the valve member 134 is shown in FIG. 7. High pressure fluid from line 46 will flow through passages 246 to 250 and 248 into cross passages 260 and 264 and into the central portion of chambers 62 and 60. The pressure will then be transmitted through passages 232 and 230 and 240 and 238 to the left and right brake assemblies. Since both brake assemblies will be actuated by the same interconnected fluid pressure, which is a function of the pressure exerted on the brake pedals 12 and 22 the vehicle will stop without swerving. Of course, when the operator desires to simultaneously stop and turn the vehicle, uneven pressure will be exerted on the brake pedals by the operator, the largest pressure being exerted on the pedal on the side toward which the vehicle is to turn.

The booster-equalizer assembly 16 is shown in FIG. 8 in an emergency or power failure condition wherein the flow of high pressure fluid from conduit 46 has been interrupted due to engine failure or some unforeseen occurrence. When this occurs, the vehicle can be stopped by actuating both brake pedals 12 and 22 in the same manner as when full power is available. Actuating both brake pedals operates both master cylinder assemblies 14 and 24 to pressurize the brake fluid within cylinder members 116, and 70, respectively. The relatively high pressure fluid will flow from the master cylinder assemblies 14 and 24 through the passages 212 and 214 into the chambers 60 and 62. The relatively high pressure of this fluid, caused by actuating the master cylinder assemblies 14 and 24, will move the valve members 134 and 164 forward to the position shown in FIG. 8. It should be noted that the valve members 134 and 164 will not be stopped in the operating position of FIG. 7, since an interruption in the flow of high pressure fluid from the conduit 46 has occurred and there will be relatively little pressure exerted against the surfaces 160 and 172. Of course, the movement of the valve members 134 and 164 from the initial position of FIG. 3 through the operating position of FIG. 7 will begin the initial actuation of the left and right brake structures, since fluid will be trapped within the center portions of the chambers 60 and 62 by the radial surfaces 160 and 172 of the valve members 134 and 164. The relatively high pressure fluid caused by operating the master cylinder assemblies 14 and 24 will continue the movement of the valve members 134 and 164 rearwardly until the valve members engage the plugs 140 at the forward end of the chambers 60 and 62. The passages 234 and 242 will then be opened or cleared by the valve members 134 and 164 so that fluid from the master cylinder assemblies 14 and 24 can flow through the passages 234 and 242 into the brake lines. The pressure in the brake lines 18 and 26 will be equalized by the passage 208 which interconnects the chambers 60 and 62 to provide a smooth even stopping of the vehicle without swerving. Of course, if only one brake pedal was actuated in the event of an interruption of high pressure fluid from the conduit 46, only one brake structure would be energized, since the valve member of the master cylinder assembly which was not actuated would remain in the initial position of FIG. 3.

In view of the foregoing remarks, it will be apparent that the equalizer booster assembly 16 provides for power assistance in the operation of a plurality of brake systems wherein the brake systems can be actuated contemporaneously or separately. The valve assemblies 50 and 52 are responsive to the master cylinder assemblies 14 and 24 to connect the brake lines 18 and 26 to a source of high pressure fluid when the associated master cylinder assembly is actuated. The high pressure fluid will operate the brakes of the vehicle with relatively little effort on the part of the driver. By balancing opposite surfaces, such as the surfaces 154 and 160 of the valve member 134, the brakes can be applied gradually and smoothly without jerking. The valve member will disconnect the source of high pressure fluid from the brake line when the pressure against the surface 160 is equal to a predetermined function of the pressure against the surface 154. Thus, the pressure in the brake line 26 will be built up to a pressure which is a function of the pressure exerted on the brake pedal 22 by the operator of the vehicle. When this pressure is reached the brake system is stabilized until the pressure on the brake pedal is either increased or decreased. While particular embodiments of the invention have been shown, it should be understood, of course, that the invention is not limited thereto, since many modifications may be made; and it is therefore contemplated to cover by the appended claims any such modifications as fall within the true spirit and scope of the invention.

What is claimed is:

1. An assembly comprising: wall means defining a plurality of chamber means; a piston assembly located in a first chamber means for selectively energizing a brake means; a valve member located in a second chamber means and associated with said piston assembly; and passage means connecting said second chamber means to said first chamber means, said brake means and a source of fluid under pressure, said valve assembly being operated by actuation of said piston assembly to connect said brake means to said source of fluid under pressure until the brake means is energized by fluid having a pressure which is a function of a pressure formed in said first chamber means by actuation of said piston assembly, said valve assembly being automatically operated to disconnect said brake means from said source of fluid under pressure when the brake means is energized by fluid having a pressure which is a predetermined function of the pressure formed in said first chamber means by actuation of said piston assembly.

2. An assembly as set forth in claim 1 wherein: said valve assembly is operable upon an interruption of fluid from said source of fluid under pressure to connect said first chamber means directly to said brake means to energize said brake means with fluid having a pressure which is substantially equal to the pressure formed in said first chamber means by actuation of said piston assembly.

3. An assembly as set forth in claim 1 wherein: said valve assembly includes a member having a first surface of relatively large area which is engaged by a first body of fluid extending from said first chamber means to said second chamber means whereby fluid pressure is exerted against said first surface by said first body of fluid when said piston assembly is actuated to operate said valve assembly and connect said brake means to said source of fluid under pressure, said member including a second surface of relatively small area which is engaged by a second body of fluid extending from said brake means to said second chamber means, said second body of fluid being connected to said source of fluid under pressure by actuation of said valve assembly until a force exerted by said second body of fluid on said second area of said second area is sufficient to offset a force exerted by said first body of fluid on said first area of said member whereupon said valve assembly is operated to disconnect said second body of fluid from said source of fluid under pressure, said brake means being energized by the pressure in said second body of fluid.

4. An assembly comprising: wall means defining a plurality of chamber means; a first piston assembly located in a first chamber means to selectively energize a first brake means; a second piston assembly located in a second chamber means to selectively energize the second brake means; a first valve assembly located in a third chamber means and associated with said first piston assembly; a second valve assembly located in a fourth chamber means and associated with said second piston assembly; first passage means connecting said third chamber means to said first chamber means, said first brake means and a source of fluid under pressure, said first valve assembly being operated by actuation of said first piston assembly to connect said first brake means to said source of fluid under pressure to energize said first brake means by fluid having a pressure which is a function of the pressure formed in said first chamber means by actuation of said first piston assembly, said valve assembly being automatically operated to disconnect said first brake means from said source of fluid under pressure when the first brake means is energized by fluid having a pressure which is a predetermined function of the pressure formed in said first chamber means by actuation of said first piston assembly; second passage means connecting said fourth chamber means to said second chamber means, said second brake means and a source of fluid under pressure, said second valve assembly being operated by actuation of said second piston assembly to connect said second brake means to said source of fluid under pressure until said second brake means is energized by fluid having a pressure which is a function of the pressure formed in said second chamber means by actuation of said second piston assembly, said second valve assembly being automatically operated to disconnect said second brake means from said source of fluid under pressure when said second brake means is energized by fluid having a pressure which is a predetermined function of the pressure formed in said second chamber means by actuation of said second piston assembly; and third passage means connecting said third chamber means to said fourth chamber means, said first and second valve assemblies being operable upon interruption of said fluid from said source of fluid under pressure to connect said first chamber means directly to said first brake means and said second chamber means directly to said second brake means to energize said first and second brake means with fluid having a pressure which is substantially equal to the pressure formed in said first and second chamber means respectively by actuation of said first and second piston assemblies, said third passage means interconnecting said third and fourth chamber means to equalize the pressure in said first and second chamber means and to thereby equalize the pressure energizing said first and second brake means when an interruption of fluid from said source of fluid under pressure occurs.

5. An assembly as set forth in claim 4 wherein: said first valve assembly includes a first member having a first surface of a relatively large area which is engaged by a first body of fluid extending from said first chamber means to said third chamber means whereby fluid pressure is exerted against said first surface body of fluid when said first piston assembly is actuated to operate said first valve assembly and connect said first brake means to said source of fluid under pressure, said second member including a second surface of relatively small area which is engaged by a second body of fluid extending from said first brake means to said third chamber means, said second body of fluid being connected to said source of fluid under pressure by actuation of said valve assembly until a force exerted by said body of fluid on said second area of said first member is sufficient to offset a force exerted by said first body of fluid on said first area of said first member whereupon said valve is operated to disconnect said second body of fluid from said source of fluid under pressure; said second valve assembly includes a second member having a first surface of relatively large area which is engaged by a third body of fluid extending from said second chamber means to said fourth chamber means whereby fluid pressure is exerted against said first surface by said third body of fluid when said second piston assembly is actuated to operate said second valve assembly and connect said second brake means to said source of fluid under pressure, said second member including a second surface of relatively small area which is engaged by a fourth body of fluid extending from said second brake means to said fourth chamber means, said fourth body of fluid being connected to said source of fluid under pressure by actuation of said second valve assembly until a force exerted by said fourth body of fluid on said second area of said second member is sufficient to offset a force exerted by said third body of fluid on said first area of said second member whereupon said second valve assembly is operated to disconnect said fourth body of fluid from said source of fluid under pressure, said second and fourth bodies of fluid being disconnected from said first and second brake means and said first and second bodies of fluid being connected to said first and second brake means and to each other by said third passage means upon an interruption of fluid from said source of fluid under pressure.

6. An assembly comprising: a housing means defining a plurality of chamber means; a cylinder member fixedly mounted in a first chamber means in said housing means, said cylinder member having side walls positioned in abutting engagement with a surface of a first section of said first chamber means, said side walls of said cylinder member defining a central cavity; a piston member slidably mounted in said first chamber means, said piston member having side walls positioned in abutting engagement with a surface of a second section of said chamber means, said piston member being located in a telescopic relationship with said cylinder member and extending into the central cavity of said cylinder member; a valve member slidably mounted in a second chamber means in said housing means; a first passage means formed in said valve member; a second passage means formed in said housing and connected to a source of fluid under pressure; a third passage means formed in said housing and connected to a brake means; and a fourth passage means extending from the central cavity of said cylinder member through said housing means to said second chamber means to enable fluid to flow under pressure from the central cavity of said cylinder member to said second chamber means when the telescopic relationship between said piston member and cylinder member is increased to slide said valve member from a first position in which said first passage means is blocked by a surface of said second chamber means to disconnect said brake means from said source of fluid under pressure to a second position in which said first passage means is in substantial registration with said second and third passage means to connect said brake means to said source of fluid under pressure and to thereby energize said brake means.

7. An assembly as set forth in claim 6 wherein: said surface of said second section of said first chamber means is located radially inwardly of said surface of said first section of said chamber means to mount said piston member with said side wall of said piston member in a spaced apart relationship relative to said side wall of said cylinder member to facilitate increasing the telescopic relationship between said piston member and said cylinder member.

8. An assembly as set forth in claim 6 further including: a fifth passage means formed in said housing and connected to a reservoir of fluid, said first passage means being connected to said fifth passage means when said valve member is in said first position to maintain said brake means in a deenergized condition, said fifth passage means being blocked by said valve member when said valve member is in said second position to maintain said brake means in an energized condition.

9. An assembly as set forth in claim 6 wherein: said valve member is moved from said first position to said second position by fluid force on a first surface of said valve member, said fluid force on said first surface resulting from an increasing of the telescopic relationship between said piston member and said cylinder member, said valve member being moved from said second position to a third position intermediate said first and second positions by fluid force on a second surface of said valve member, said fluid force on said second surface resulting from the registration of said first and third passage means, said valve member being moved to said third position to block said first passage means and stabilize the pressure within said third passage means when the fluid force exerted on said second surface exceeds the fluid force exerted on said first surface.

10. An assembly comprising: wall means defining a plurality of chamber means; a piston slidably mounted in a first chamber means; a valve member slidably mounted in a second chamber means; a first passage means formed in said valve member; a second passage means connecting said second chamber means to a source of fluid under pressure; a third passage means connecting said second chamber means to a brake means; and a fourth passage means extending from said first chamber means to said second chamber means to enable fluid pressure to be transmitted from said first chamber means to said second chamber means when said piston is moved in a first direction in said first chamber means to move said valve member from a first position to a second position, said second passage means being blocked by the surface of said second chamber means when said valve member is in said first position to block transmission of fluid pressure from said source of fluid under pressure to said brake means to maintain said brake means in a released condition, said first passage means being in substantial registration with said second and third passage means when said valve member is in said second position to enable pressure to be transmitted from said source of fluid pressure to said brake means to actuate said brake means.

11. An assembly as set forth in claim 10 wherein: said valve member is moved from said first position to said second position by a first force resulting from fluid pressure against a first area of said valve member, said valve member being moved from said second position to a third position by a second force opposing said first force, said second force resulting from fluid pressure against a second surface area of said valve member to move said valve member to said third position in which said first passage means is blocked by said surface of said second chamber means when said second chamber means and fluid in said third passage means is maintained at a substantially constant pressure to maintain said brake means in an actuated condition.

12. An assembly as set forth in claim 11 further including: a fifth passage means interconnecting said first chamber means and said third passage means, said valve member being moved to a fourth position by fluid pressure on the first surface of said valve member when the fluid pressure from said source of fluid under pressure is interrupted, said first chamber means being in fluid communication with said first passage means through said fifth passage means when said valve member is in said fourth position to transmit the fluid pressure resulting from movement of said piston in said first direction to said brake means to actuate said brake means.

References Cited
FOREIGN PATENTS 543,418   2/1942   Great Britain.

MARTIN P. SCHWADRON, *Primary Examiner.*

R. R. BUNEVICH, *Assistant Examiner.*

U.S. Cl. X.R.

60—54.6, 52, 10.5